April 26, 1949.  R. HARDY  2,468,064
RADIOGONIOMETER

Filed May 28, 1943  4 Sheets-Sheet 1

INVENTOR
RENÉ HARDY
BY Edward D. Phinney
ATTORNEY

April 26, 1949.   R. HARDY   2,468,064
RADIOGONIOMETER

Filed May 28, 1943.   4 Sheets-Sheet 2

INVENTOR.
RENÉ HARDY
BY Edward D. Phinney
ATTORNEY

April 26, 1949.  R. HARDY  2,468,064
RADIOGONIOMETER
Filed May 28, 1943  4 Sheets-Sheet 3
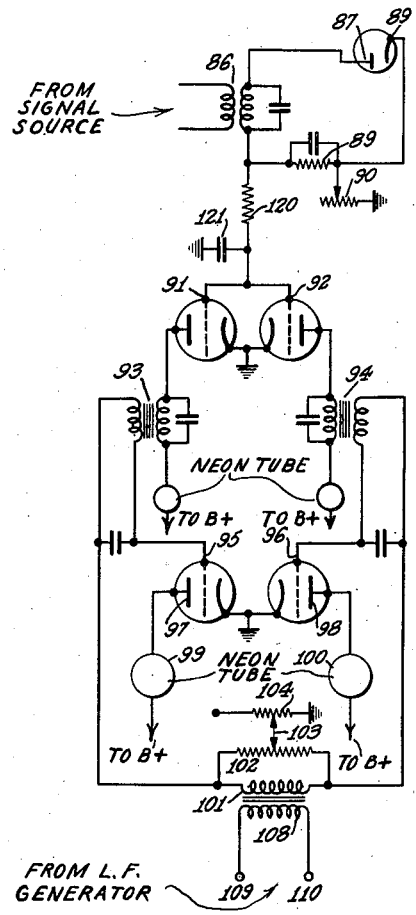
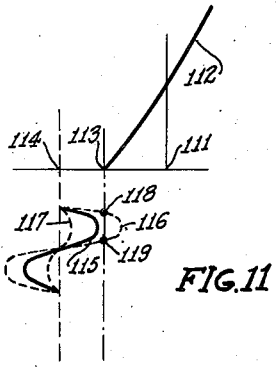
FIG.11
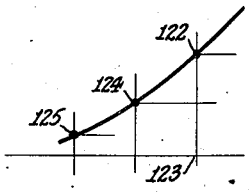
FIG.12
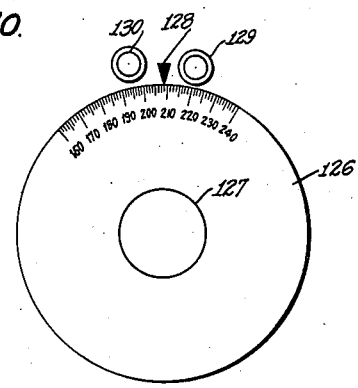
FIG.13
INVENTOR
RENÉ HARDY
BY Edward D. Phinney
ATTORNEY Patented Apr. 26, 1949

2,468,064

UNITED STATES PATENT OFFICE 2,468,064

RADIOGONIOMETER

René Hardy, Lyon, France, assignor to International Standard Electric Corporation, New York, N. Y.

Application May 28, 1943, Serial No. 488,877
In France April 25, 1941

Section 1, Public Law 690, August 8, 1946
Patent expires April 25, 1961

8 Claims. (Cl. 343—121)

The present invention relates to radio direction finding systems and particularly to those in which the detection of the direction is effected by a manual operation.

Manual radio direction finders usually comprise a doubt eliminating system that consists of a high frequency circuit connected to a non-directional aerial such as a vertical antenna and that is set in operation by means of a key when it is desired to know the lay of a direction indication. Indeed it is possible by manipulation of the radio direction finder to determine the direction of a transmitting station, usually by audible and/or visual observation of the reception minima, but on the graduated scale that gives the bearings there are two minimum or zero reception points at 180° from each other.

In order to precisely determine the direction, the operator tests alternately to the right and the left of the minimum or zero reception point for the purpose of detecting the exact bearing, whereupon he depresses the key that connects-in the doubt eliminating device and then knows by listening in whether he is in the position of the correct direction or of the opposite direction. Upon returning the key to the position of manual detection, he can again begin to try and precisely locate the 180° point of minimum or zero reception, or else he can follow the transmitter if it is in motion, as in the case of an airplane, for example.

The chief object of the invention is to provide manual detection radio direction finders that give direct the correct indication in direction and lay of the bearing of a transmitting station without it being necessary for the operator to manipulate a doubt eliminating key or to perform any other operation than that of the abovementioned precise detection of the bearing. Radio direction finders of this kind accordingly avoid the errors resulting from wrong manipulation of the doubt eliminating key or from wrong interpretations when it is necessary to make further adjustments in order to know the true direction of the bearing.

Another object of the invention is to provide manual radio direction finders that give direct the correct indication in direction and lay of the bearing of a transmitting station while making it possible to listen in to this station irrespective of the position of the radio direction finder.

According to certain features of the invention, a manual radio direction finder that comprises a vertical antenna doubt eliminating circuit and a directional aerial radio direction finding circuit is provided with means for modulating in amplitude, by means of a low frequency modulation current, either the high frequency current proceeding from the doubt eliminating antenna or the high frequency current proceeding from the directional aerial, and for superposing this modulated current in suitable phase relation on the constant amplitude current that proceeds either from the directional aerial or the doubt eliminating antenna respectively. Means are furthermore provided for comparing the phases of the low frequency modulation current and of the low frequency envelope of the current that results from the superposition of the two modulated and non-modulated high frequency currents after frequency change and detection, and for directly deducing the desired indication of lay from this comparison.

According to another feature of the invention, means are provided for controlling at all times the amplitude of the modulated current as a function of the angular position of the rotor of the radio direction finder, the modulated current becoming cancelled at the same time as the current induced in the rotor.

According to another feature of the invention, means are provided for eliminating from the monitoring circuit the variations of the low frequency current level at the output of the receiver resulting from the above mentioned modulation of the high frequency current that serves to eliminate the 180° uncertainty regarding the lay of the indication.

These features, as well as others, will be explained in detail in the following description given with reference to the appended drawings, in which.

Figure 3:
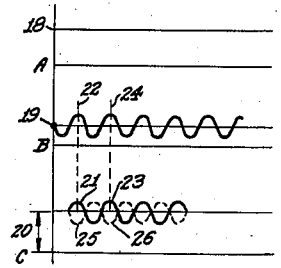
Figure 5:
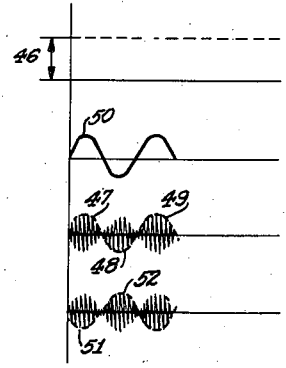
Figure 4:
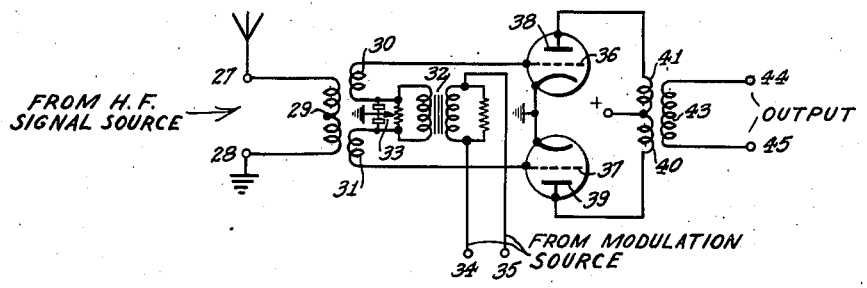
Figure 6:
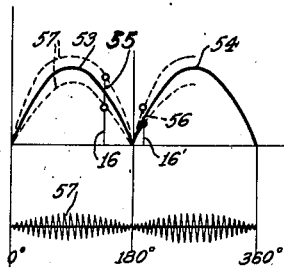
Figure 7:
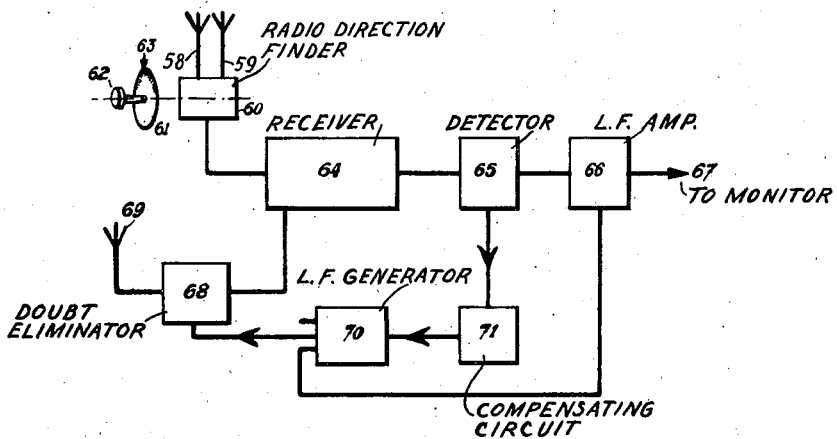
Figure 8:
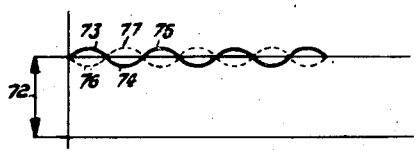
Figure 9:
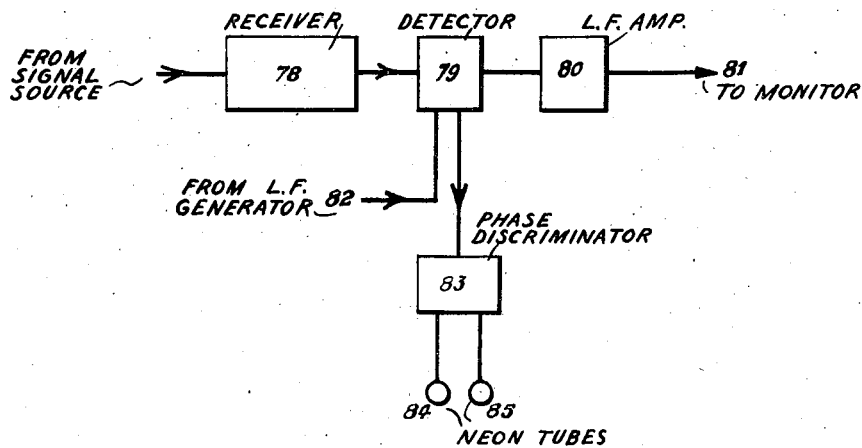
Figure 14:
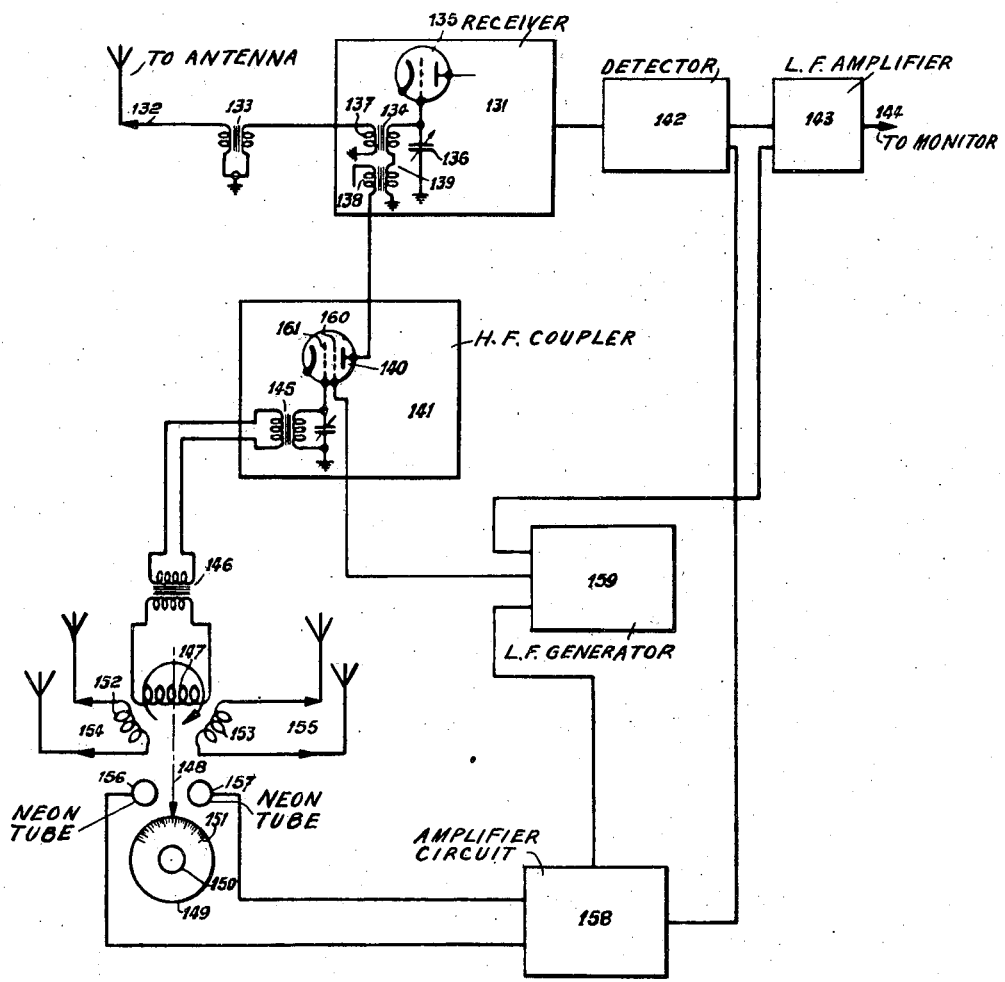

Fig. 3 shows curves intended to facilitate an explanation of the invention; Fig. 3A shows the current received in the rotor of a finder keyed to a fixed position when the radio direction finding emission is not modulated; Fig. 3B shows a vertical antenna current modulated locally in amplitude by any suitable method; and Fig. 3C shows the superposition of the currents of graphs A and B, the sinusoidal current of graph B being superposed at one time in phase and at another time in phase opposition to the current of graph A;

Fig. 4 illustrates schematically one example of a circuit that permits modulation in amplitude of a high frequency current by a low frequency current for the purpose of carrying out the objects of the invention;

Fig. 5 shows in its graphs the various currents that relate to the circuit of Fig. 4;

Fig. 6 is a graph showing the importance of the vertical antenna effect according to the amplitude of the signal of the loop aerials;

Fig. 7 illustrates one example of a reception and modulation circuit for elimination of doubt in a manual radio direction finder that incorporates features of the invention;

Fig. 8 shows a low frequency voltage curve which is used to explain the manner in which the audition is corrected in a radio direction finder like the one shown in Fig. 7;

Fig. 9 illustrates schematically one example of a radio direction finding receiver in which only a portion of the detected current is taken to feed an audible indication system;

Fig. 10 illustrates schematically one example of a circuit that makes use of features of the invention for the visual determination of the lay of a radio direction finding indication;

Figs. 11 and 12 show curves used in the explanation of the operation of Fig. 10;

Fig. 13 illustrates schematically one example of the dial of a radio direction finder that incorporates features of the invention; and Fig. 14 illustrates schematically, according to certain features of the invention, a modified arrangement of the circuit of a manual radio direction finder provided with means for doubt elimination.

In a manual radio direction finder, use is made of a radio-goniometric finder that normally comprises two stators in the form of orthogonal coils fed by two directional aerials, loop aerials or crossed pairs of antennas, and a rotor whose angular position is manually adjusted between these stators. The current induced in this rotor is applied to a receiver and, at the terminals of the detection resistance, after amplification and change of frequency if desired, the current that is obtained has an amplitude that depends on the amplitude of the high frequency current generated in the rotor of the finder. It is possible to trace the curve of variation of the detected current as a function of the angular position of the rotor. It is similar to the curve shown in Fig. 1, i. e. it comprises two successive semi-sinusoids 1 and 2. The points 3 and 4 at 0°, 180° and 360° correspond to angular positions of the rotor in which the resultant current induced by the stators is nil in the rotor. The maxima 5 and 6 of this curve correspond to the positions of maximum induction in the rotor. If the rotor is placed in any angular position, e. g. 16, there will be obtained a detected current of constant amplitude 17 if the emission is not modulated. At the points 3 and 4 this amplitude would be nil.

Although the detected current consists of two identical semi-sinusoids, the high frequency current from which it is derived consists of two semi-sinusoids in phase opposition on the grid of the input tube of the receiver, each semi-sinusoid corresponding to a half turn of the rotor. By adding to the high frequency current of the rotor a high frequency current of less amplitude proceeding from a non-directional aerial of constant phase, there will be obtained a curve of detected current of a different shape from that of Fig. 1.

Figure 2:
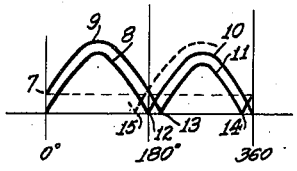
Fig. 2 shows the modification of this current when it has added to it the current furnished by a non-directive aerial, e. g. a vertical antenna.

Such a curve will be, for example, the one shown in Fig. 2.

Curves 8 and 10 correspond to the current proceeding from the radio direction finder. By superposing on this current a small current of constant phase of amplitude 7, there are obtained, for example, the detected curves 9 and 11. The minima are no longer located at the same points, the zero current point being now at 13 when the rotor has an angular displacement value of more than 180°. If the phase of the amplitude current 7 was reverse, this minimum would be brought to 15 on the other side of the minimum 12 for the curve sketched in dotted lines.

The lay of the indication furnished by the minimum 12 will then be deduced from the lay of the angular displacement of this minimum at 13 or 15 by the superposition of the current of the non-directional aerial or antenna.

Figure 1:
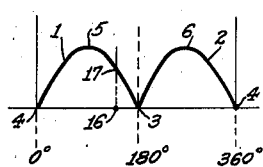
Fig. 1 shows the current received during a 360° rotation in the rotor of a finder or in a directional loop aerial of a manual radio direction finder.

If the rotor of the finder is keyed on an angular position such as 16 in Fig. 1 and if no antenna current is superposed on the rotor current, the amplitude of the detected current will be constant, as shown at 18 in Fig. 3A, when the emission picked up by the directional aerials is not modulated.

According to one feature of the invention, the current proceeding from the antenna is modulated in amplitude so as to obtain a sinusoid, e. g. like the one shown in Fig. 3B and having a mean amplitude 19 and maxima 22, 24, etc., and then this antenna current of variable amplitude is superposed on the high frequency current of fixed amplitude 18 that proceeds from the motor of the finder. At the terminals of the detection resistance there is then obtained, as shown in Fig. 3C, a sinusoidal current of mean amplitude 20 that has, for example, maxima 21, 23, etc. By reversing the phase of the antenna current with respect to the rotor current, there is obtained a sinusoidal current having minima 25, 26, etc. instead of maxima 21, 23, etc.

It is well known that the high frequency voltage induced in an antenna is staggered by 90° with respect to the voltage induced in the rotor of a finder. Fig. 3C consequently assumed that these high frequency voltages have been brought into a suitable phase relation, at about 180°, by any well known method for correcting this stagger of 90°.

One example of a simple circuit for modulating an antenna current while taking account of the phase relations is shown schematically in Fig. 4.

In this Fig. 4, the terminals 27 and 28 of the input transformer's primary winding 29 are assumed to be connected to a source of high frequency voltage, such as a vertical antenna. Each of the secondary windings 30, 31 of the input transformer feeds a grid 36 or 37 of a double amplifier tube or of two tubes mounted in opposition. The return of the transformer's two secondary windings 30, 31 is effected by means of the potentiometer 33 whose slide is connected e. g. to earth in the manner shown, or to a suitable constant bias.

By means of the low frequency transformer 32 it is also possible to induce on grids 36 and 37 a low frequency alternating voltage proceeding from a source (not shown) connected to the terminals 34, 35.

When no low frequency modulation is applied to terminals 34 and 35, and the input and output transformers are symmetrical, the circuit may be disposed in such a way that there is no high frequency voltage between the output terminals 44, 45, in other words so that plates 38, 39 of the two tubes in opposition apply high frequency voltage of the same amplitude and of opposite phase to the opposition windings 40, 41 of the output transformer.

This symmetrical circuit is unbalanced when a modulation voltage is applied by transformer 32 to grids 36 and 37 of the two tubes. This alternating modulation voltage modulates in phase opposition the two grids 36 and 37 and produces at terminals 44, 45 a high frequency voltage that has a certain phase during a half period of the modulation or of the low frequency scanning and a reverse phase during the other half period.

In Fig. 5, 46 indicates the high frequency voltage of constant amplitude proceeding from the antenna, 50 the sinusoid of low frequency modulation, and 47, 48, 49 the envelope curve which shows the alternately positive and negative half periods of the high frequency voltage modulated at the terminals 44, 45. It is quite evident that reversal of the connections of the antenna at the terminals 27, 28 will furnish a reverse envelope curve like the one shown at 51, 52.

According to one feature of the invention, the high frequency voltage proceeding from the antenna circuit and thus modulated in amplitude and of suitable phase is then superposed on the high frequency voltage of the rotor with a value proportional to that of the voltage produced in the rotor, and this insures precision of reading, as will be shown further on in the explanation.

In Fig. 6, curve 53—54 represents the current proceeding from the rotor of a radio direction finder after amplification and detection. For a definite angular keying of the rotor, e. g. 16, there is introduced into a suitable superposition circuit a high frequency current proceeding from a vertical antenna having an amplitude like that shown at 55, for example. For another angular keying position 16' of the rotor that is closer to a minimum of the curve 53—54, there is introduced a high frequency current having a lower amplitude, e. g. 56. 57 illustrates an example of an amplitude variation curve of the high frequency current that proceeds from the antenna as a function of the angular keying of the rotor, the limits of this amplitude variation being also shown on the graph containing the curve 53—54.

Fig. 7 illustrates schematically one example of a circuit that makes it possible to obtain an antenna current thus modulated in amplitude according to the angular position of the rotor of the radio direction finder. In this Fig. 7, the directive aerials are connected at 58 and 59 to a radio direction finder 60 which may be of any suitable structure. This finder 60 feeds receiver 64 by means of its rotor. The manual adjustment of the angular position of the rotor is effected by means of the control knob 62 which is in association with a dial 61 which shifts in front of a stationary guide mark 63.

The receiver 64 amplifies the signals proceeding from the finder and transmits them to a detector circuit 65 that is followed by a low frequency amplifier 66 which may be connected, e. g. as shown at 67, to a suitable monitoring system.

The doubt eliminating circuit 68, which is fed by a non-directional aerial such as a vertical antenna 69, comprises a known arrangement for suitably phasing the antenna current with respect to the rotor current. When this doubt eliminating circuit is in operation, it introduces into receiver 64 a high frequency current which superposes on that proceeding from the rotor of finder 60.

In addition to means for effecting a suitable phasing of the voltages proceeding from antenna 69, the doubt eliminating circuit 68 may comprise a circuit similar to that shown in Fig. 4 in order to apply to the input of receiver 64 voltages that are modulated sinusoidally in amplitude by means of the low frequency modulation generator 70 which may consist of any known type of generator of sinusoidal oscillations.

The size of the antenna current introduced into receiver 64 depends on the size of the modulation voltages proceeding from the generator 70. In order to adjust this antenna current as a function of the angular position of the rotor, and accordingly of the constant amplitude of the current proceeding from the directional aerials, a compensating or regulating circuit 71, according to one feature of the invention, is inserted between the detector circuit 65 and the low frequency modulation generator 70. This circuit 71 may consist of an automatic gain regulator of a structure well known in itself and it may be disposed in the circuit so as to control in amplitude the output voltages of the low frequency generator 71 as a function of the mean amplitude of the voltages detected at a given moment by circuit 65.

According to one feature of the invention, the adjustment of circuit 71 may then be effected in such a way that when there is no current in the rotor of finder 60 (positions 0°, 180° and 360° of the rotor), the doubt elimination circuit 68 does not introduce any antenna current into receiver 64 and, on the contrary, the amplitude of the antenna current is all the greater according as the signal proceeding from the rotor is stronger, as shown in curve 57 of Fig. 6.

The antenna current fed into the input of the receiver is thus modulated according to the size of the detected mean current. It may however be admitted in a general way that one will get a percentage of modulation of the current detected by means of the low frequency generator 70. This percentage may be reduced in certain cases to 10% for good operation of the lay indicating device, but this modulation inevitably appears in the low frequency circuit and in the monitoring devices 67. This disturbance can be eliminated, although as a rule it does not cause much trouble because it is possible to select a modulation frequency that is sufficiently low or sufficiently high not to affect the hearing.

Fig. 8 shows a low frequency voltage obtained in the monitoring circuit. This voltage has a mean amplitude 72 with maxima 73, 75 corresponding to the low frequency modulation of the antenna current. In order to eliminate this variation of amplitude, the low frequency circuit 66 will consist of any suitable type of system with automatic gain regulator into which there is fed a voltage proceeding from the low frequency modulation generator 70, as shown in Fig. 7, and having minima such as 76 in opposition to maxima such as 73, and maxima such as 77 in opposition to minima such as 74. The amplitude of this alternating regulation voltage is adjusted in a suitable manner so as to reestablish a substantially constant level in the monitoring circuit 67.

In the detector circuit 65 of the receiver there is thus available an envelope curve or, to be more exact in the case of a definite manual adjustment of the radio direction finder 60, a given amplitude of a L. F. modulated voltage. According as the antenna current is or is not in phase opposition with respect to the current that proceeds from the radio direction finder, this sinusoid of low frequency amplitude modulation is in phase or in phase opposition with that proceeding from the low frequency modulation generator 70 coupled to the low frequency amplifier 66 and that is connected to the doubt eliminating circuit 68. This arrangement makes it possible to obtain direct indications of the actual lay of the direction.

Fig. 9 illustrates schematically the arrangement of a radio direction finding receiver from which only a portion of the detected current is taken to feed a lay indicating system.

The receiver 78 is connected to the detector 79 which feeds, on the one hand, the low frequency circuit 80 and monitoring means connected at 81 to this circuit independently of the control of the amplitude of the low frequency generator 82 and of the other associated gain regulation circuits, and which feeds, on the other hand, the phase discriminating circuit 83 which is connected to two neon tubes 84, 85, for example. The object of this phase discriminating circuit, one example of an embodiment of which will be described further on, is to indicate by one of the visual indicators, e. g. 84, that the low frequency sinusoid that appears on the envelope curve of the detected current at 89 is in phase with the initial sinusoid of the low frequency generator 70 that feeds the doubt eliminating circuit 68. If the sinusoid taken from detector 79 is in phase opposition with that of generator 70, it is the other visual indicator, e. g. 85, that will light up.

In order to obtain such a lay indication, use may be made of any known circuit by which this phase discrimination can be produced. Similarly, the visual indicators 84 and 85 may be of any kind that will give evidence of the desired phase relation. For example, use may be made for such indicators of cathode ray tubes of the kind generally used for visual adjustment in the construction of radio broadcast receivers. It is also possible to employ milliammeters or other instruments which, instead of a needle, have a suitable shutter that uncovers an opening to a greater or lesser extent, or controls some source of illumination to a greater or lesser extent. Use may also be made of a differential milliammeter that moves to the right or to the left or exposes to view, to the right or to the left, visual indicators of greater or lesser brilliancy. It is also possible to construct a neon tube that comprises two linear electrodes of greater or less length, a central luminous spot that is at rest being symmetrically located with respect to a shaft or to some guide mark, and the lengthening of this spot varying to the right or the left according to the respective feed intensities of different electrodes.

In one simple example of an embodiment that employs features of the invention, use is made of two little neon tubes of the pilot tube type connected to a detector circuit by a suitable blocking circuit, possibly in association with a preliminary amplification circuit.

Fig. 10 illustrates schematically one example of a circuit that permits feeding of one or other of the two neon tubes according to the phase of the low frequency sinusoid on the detector. In this Fig. 10, the last amplifier stage of the receiver is shown as an intermediate frequency transformer 86 that feeds a detector circuit 87. The detected voltages are taken from the cathode 88 at the terminals of the detection resistance 89 and they are forwarded to grids 91, 92 of a double triode or of two triode tubes having a common bias, e. g. as shown at 90. A time constant circuit, e. g. one that consists of a resistance 120 and a capacity 121, or any other well known suitable arrangement, may be provided between the detection resistance 89 and the grids 91, 92 in order to eliminate as much as possible any disturbances or signals of a higher frequency than that of the sinusoid that it is desired to investigate.

In the plate circuit of the double tube or of the two triode tubes there are respectively provided tuned transformers 93 and 94 that resonate at the frequency of the filtered sinusoid so as to introduce substantially pure sinusoidal voltages on grids 95 and 96 of the output stage of this amplifier.

The output stage may likewise comprise a double triode tube or two triode tubes. The phase discrimination may be effected by modulating the return point of the two grids 95 and 96 of this stage by the initial sinusoidal voltage of the low frequency generator 70 (Fig. 7). A transformer 101, at the terminals 109 and 110 of whose primary winding the low frequency sinusoidal voltage of the generator is introduced, distributes in suitable proportions, which can be equalized by means of the potentiometric connection arrangement 102, 103, 104, sinusoidal voltages that will be in phase opposition on grids 95 and 96 owing to the symmetry of the connection arrangement thus made. Furthermore, the low frequency sinusoids that proceed from transformers 93 and 94 will act on the grids 95 and 96 in phase with respect to each other.

The bias of the output amplifier stage may be adjusted in such a way that the curvature of the plate current 112 (Fig. 11) is such that the working point 113 of each of the two triodes of this output stage is staggered with respect to the resting point 114 of grids 95 and 96. The bias value of these grids may then be taken to be the sinusoid 115 which is the one that proceeds from the low frequency generator and, according as this sinsusoid is in phase or in phase opposition with the sinusoid proceeding from the detector circuit on one or other of the grids 95 and 96, the resultant voltage will be modified, giving maxima 116 or 117 to the modulation voltage of these grids. These maxima 116 and 117 are adjusted in such a way that when the detected sinusoid is in phase with the low frequency sinusoid, the plate current can attain a sufficient amplitude to cause the illumination of one of the neon tubes 99 or 100 which are connected in the plate circuits 97 and 98 of the output stage. One or other of the neon tubes 99 and 100 will light up according to whether the phase of the detected sinusoid is or is not in opposition with the phase of the low frequency sinusoid proceeding from the generator that is on one of the two grids 95 and 96.

The two input tubes whose grids are indicated by the reference numbers 91 and 92 may be arranged to have a variable slope so that the working point 124 or 125 on the characteristic 122 of these tubes (Fig. 12) may be different according to the amplitude of the detected signal. The circuit of Fig. 10 may consequently be modified in known manner. An adjustment of this kind will result in giving a substantially constant amplitude to the alternating voltages that act on the neon tubes 99 and 100 when the amplitude of the detected signal varies.

The two neon tubes thus employed may be placed close to the pointer or reading guide mark of the radio direction finder, e. g. as shown in Fig. 13. In this Fig. 13, the turning of the knob 127 that moves the dial 126 connected to the rotor of the finder and the oscillation of this dial around the point that corresponds to zero audible reception, cause one or other of the two neon tubes 129 or 130 to light up when this point under the guide mark 126 is passed, according as the direction is to the right or to the left. However, when the dial is turned alternately both ways in order to seek the direction with the greatest possible precision, the neon tube 129 may light up when the shift of the dial is to the right, and then when the dial passes the reception zero on its return movement, this tube 129 is extinguished at the precise moment of arriving at the reception zero and, upon continuing the rotation to the left, the neon tube 130 will then light up in its turn.

Upon passing 180°, i. e. the other spot on the dial for which reception is also zero, it will be noted that the left hand tube 130 will light up when the knob is turned to the right and, vice versa, it is the right hand tube that will light up when the knob is turned to the left.

It can consequently be seen that there is no doubt as to the real direction when it is remembered that every time the knob is turned to the right of the reception zero it is the right hand tube that should light up.

Instead of modulating in the above described manner the amplitude of the high frequency current proceeding from the vertical antenna or from the non-directional aerial and superposing this modulated current on the current of constant amplitude proceeding from the rotor of the radio direction finder, another feature of the invention provides instead for the modulation of the amplitude of the high frequency current that proceeds from the radio direction finder while retaining a constant amplitude for the high frequency current of the antenna.

As can be seen clearly from the following description of an example of an embodiment shown in Fig. 14, this latter method not only effects elimination of doubt in the manner explained above but also makes it possible to monitor a station whose direction is being sought even when the radio direction finder is located in any position.

In Fig. 14, receiver 131 is fed by antenna 132 by means of a coupling transformer 133 which is as a rule provided at the base of the antenna in radio direction finding installations that comprise collectors of the Adcock type. A second coupling transformer 134 is provided with a coupling that is relatively loose between its primary winding 137 and its secondary winding 139 and thus makes it possible, for example, to effect compensation of the phase difference between the vertical antenna and the directional aerials.

The secondary 139 of this transformer 134 may be tuned by a variable condenser 136 and feed the first tube 135 of receiver 131.

It is however evident that it is possible to adopt any other coupling between the non-directional aerial and the grid of the input tube of the receiver, particularly a coupling that permits modification in any suitable manner of the phase of the high frequency current proceeding from antenna 132.

Receiver 131 is followed by a detector circuit 142 and a low frequency amplifier 143 which is connected, as shown in the drawing, by the connection 144 to a suitable monitoring device of any known type.

This assembly of elements can serve as a receiver for all known purposes and particularly just for reception of radio broadcasting stations owing to the fact that the aerial 132 is not directional.

The input circuit of receiver 131 also comprises a coupling circuit that makes possible the introduction into it of high frequency voltages proceeding from circuit 141. For example, use may be made of a second primary winding 138 of the input transformer 139 of the receiver. In this way, the amplifier tube 140 can also feed receiver 131 with high frequency current and this high frequency current can proceed from the rotor 147 of the radio direction finder.

The input transformer 145 of circuit 141 is preferably of the tuned secondary type, and transformer 146 which is a constant coupled one serves as link between the rotor 147 and the amplifier circuit 141. The two stators 152 and 153 of the radio direction finder are coupled in a suitable way, as shown at 154 and 155, to systems of directional aerials such as aerials of the Adcock type.

The circuit of the radio direction finder can operate in the usual way, i. e. upon rotation of the dial 149 by means of the manual control knob 150, the rotor 147 of the radio direction finder is set in motion by the shaft 148. For precise balancing of the installation there are then obtained two positions of extinction at 180° from each other for a station whose transmission is received by directional aerials. The circuit 141 which serves for amplifying the current that is produced in the rotor 147 may, for example, comprise an input tube 140 in which an additional grid 160 permits modulation of the output of this tube by applying to it a sinusoidal voltage of relatively low frequency by means of the generator 159.

When the radio direction finder is placed in a position of zero reception, the circuit can be adjusted in such a way that no high frequency voltage is induced in the receiver 131 by the winding 138. The receiver 131 will then only be sensitive to the high frequency voltages proceeding from the aerial 132. When one is to the right or to the left of the reception zero of the radio direction finder, the winding 138 will apply to the input tube 135 of the receiver a high frequency current which will superpose in phase or in phase opposition on the high frequency current proceeding from the non-directional aerial 132. According to whether one is to the right or to the left of the zero position, and as a result of the sinusoidal modulation of the high frequency amplitude proceeding from the finder, there is obtained in the detector circuit 142 an envelope curve that is modulated by this low frequency sinusoidal voltage, but in phase or in phase opposition with respect to the sinusoid proceeding from generator 159 to the low frequency amplifier 143. Comparison of the phase of the modulated voltage and the low frequency voltage provides the desired bearing information. This permits the feeding by means of the amplifier circuit 158 of either the neon indicator tube 156 or the neon indicator tube 157 according to the relative phases of the sinusoids tapped from the envelope curve of the detector circuit and of the sinusoid proceeding from generator 159. Upon turning the dial 149 of the radio direction finder to the right or to the left of the point of zero reception there is obtained an indication that makes it possible to know direct the lay of the direction, this direction being obtained for the position of the finder in which no illumination takes place in the neon tubes, i. e. for the position of zero induction in rotor 147.

It is evident that in the circuit of Fig. 14 use may be made of cathode ray tubes or of movable frame instruments instead of the neon tubes 156 and 157. Similarly, circuit 141 may consist of a symmetrical circuit like the one described in connection with Fig. 4. It is also possible to correct the amplitude of the low frequency current of circuit 143 in such a way as to reestablish a uniform level and eliminate the undesirable modulation by means of the sinusoid of generator 159. This correction has been described above in connection with Fig. 8. Use may also be made of a system that permits regulation of the gain of the phase discriminating circuit 158 as described in connection with Fig. 12 and, depending on the size of the detected signal, it is also possible to apportion the sinusoidal voltages that modulate circuit 141, whether it is symmetrical or not, according to the method described above.

It is evident that in the different examples of embodiment described above, the circuits or elements that do not specifically concern the present invention have not been shown or described in detail.

It is likewise evident that the invention is not restricted to the various examples of embodiments shown and described, but, on the contrary, that it is capable of numerous modifications and adaptations without departing from its scope.

I claim:
1. Radio direction finder including a doubt eliminating antenna system and a directional antenna system, an angularly adjustable coil fed by currents derived from the directional antenna system to determine direction and direction plus 180°, means for amplitude modulating at a relatively low frequency the current proceeding from one of said antenna system, means for superposing said modulated current upon the constant amplitude current proceeding from the other antenna system, monitoring circuit means for comparing the respective phases of said low frequency modulating current and of the low frequency envelope of the current that results from the superposition of the two modulated and nonmodulated high frequency currents after frequency change and detection, and means for directly deducing the desired indication of direction from said comparison, said modulating means including two electronic tubes connected in push-pull, means for feeding the grids thereof in opposition as to said one antenna system current, but in series as to the modulating current, and an opposing output circuit providing an output of high frequency voltage that has a predetermined phase during one half period of the modulation of the low frequency scanning and a reverse phase during the other half period, said modulating means responsive to said output for controlling the modulation of said one antenna system current, whereby greater precision of indication is secured.

2. A radio direction finder including a directive antenna system, means for effecting rotating said directive antenna system, a receiver fed by said antenna system, a detector fed by said receiver, a low frequency amplifier fed by said detector and delivering output signals, a non-directive antenna, a doubt eliminator fed thereby and also feeding said receiver, a low frequency modulation generator feeding said doubt eliminator and a compensating circuit fed by said detector and feeding said generator, also including a first pair of electronic tubes, means for feeding the detected voltages thereto, a relatively long time constant circuit included in said feeding means to reduce parasites, transformers in the anode circuits of the respective tubes and tuned to signal frequencies, a second pair of electronic tubes, means for biasing said second pair of tubes, means for modulating said biasing means by the voltage of said low frequency generator, means for feeding said second pair of tubes from said transformers, and visual indicating means connected in the anode circuits of said tubes for deriving the output of each of said second pair of tubes, said biasing means being adjusted so as to make the working bias on one tube offset with respect to the bias on the other tube, whereby one visual indicating means only will be actuated, in the anode circuit of the tube in which grid and anode modulation voltages are additive in phase.

3. A radio direction finder free of bi-directional ambiguity, said finder comprising a non-directive antenna system and an effectively rotating directive antenna system, a receiver, means for feeding the output from said directive antenna system to said receiver, a detector fed by said receiver, a low frequency amplifier fed by said detector and delivering output signals, a doubt-eliminating circuit fed by said non-directive antenna and feeding said receiver, a low frequency modulation generator feeding said doubt-eliminator, automatic volume control means connected between said low frequency generator and detector, said automatic volume control being responsive to detector output for controlling the output of said low frequency generator, and means for supplying a portion of the output of said low frequency generator to control said low frequency amplifier.

4. The system according to claim 3 wherein a phase discriminator is connected to said low frequency amplifier and wherein two visual indicators of phase are connected to said phase discriminator.

5. A radio direction finding system comprising a non-directive antenna system and an effectively rotating directive antenna system, a modulation signal source for modulating the output of one of said antenna systems, means for combining and detecting the output of said other antenna system and said modulated output, an indicator means for applying said detected output and said modulation signals to said indicator for comparing their respective phases, and means responsive to said detected output, for controlling the amplitude of the signals from said modulation source.

6. A radio direction finding comprising a directive antenna system having its directive effect adjustable for alignment with a source of radiation whereby a null in the signal is produced in a line indicating the direction to said source, a non-directive antenna system, a low frequency energy source and means for modulating the energy from one of said antenna systems to produce side-band energy only, a control system for providing nonambiguous direction indications comprising means for combining the energy from said antennas to provide a resultant energy, and means responsive to the ampliude of said resultant energy for correspondingly controlling the amplitude of said low frequency source.

7. In a direction finder according to claim 6, means for detecting said resultant energy to provide a monitoring voltage, and means for comparing the phase of the monitoring voltage with the phase of the energy from the low frequency source.

8. An arrangement as set forth in claim 6 further comprising means coupled to the output of said receiver and to said modulation signal source for comparing the phase of said receiver output with the output of said one antenna system comprising a balanced modulator circuit, means for applying said receiver output co-phasely to said balanced modulator circuit, and for applying said modulation signals in phase opposition to said balanced modulator circuit.

RENÉ HARDY.

REFERENCES CITED

The following references are of record in the file of this patent:

UNITED STATES PATENTS

| Number | Name | Date |
|---|---|---|
| 2,003,932 | Greig | June 4, 1935 |
| 2,003,933 | Greig | June 4, 1935 |
| 2,156,297 | Kruesi | May 2, 1939 |
| 2,184,306 | Kruesi | Dec. 26, 1939 |
| 2,234,331 | Bond | Mar. 11, 1941 |
| 2,263,377 | Busignies | Nov. 18, 1941 |
| 2,314,029 | Bond et al. | Mar. 16, 1943 |